April 2, 1968  G. L. WILDE  3,375,996
GAS TURBINE ENGINES
Filed Feb. 16, 1967  2 Sheets-Sheet 1
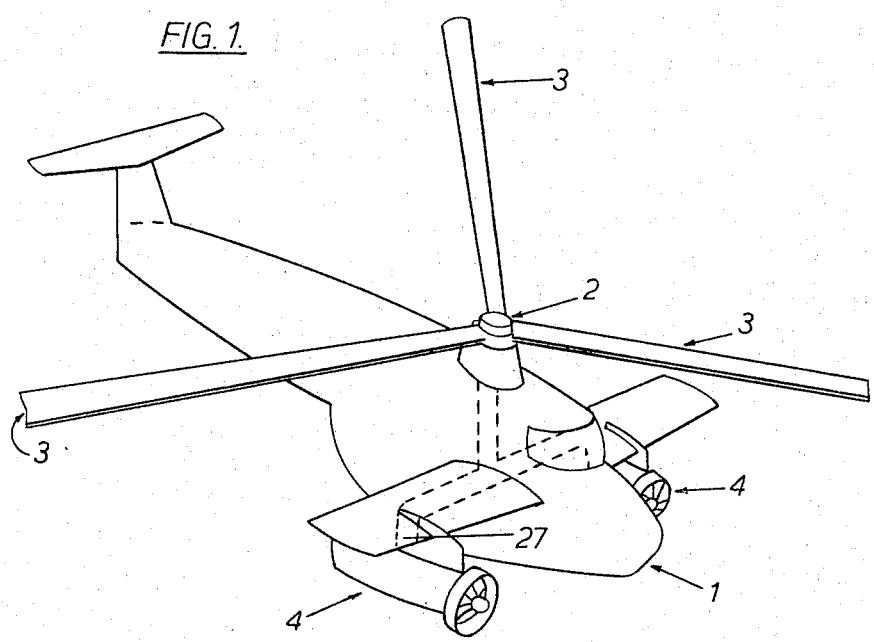
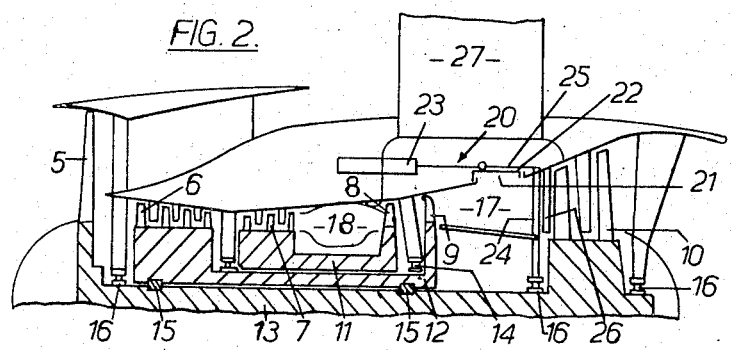
Inventor
Geoffrey Light Wilde
By
Cushman, Darby & Cushman
Attorneys

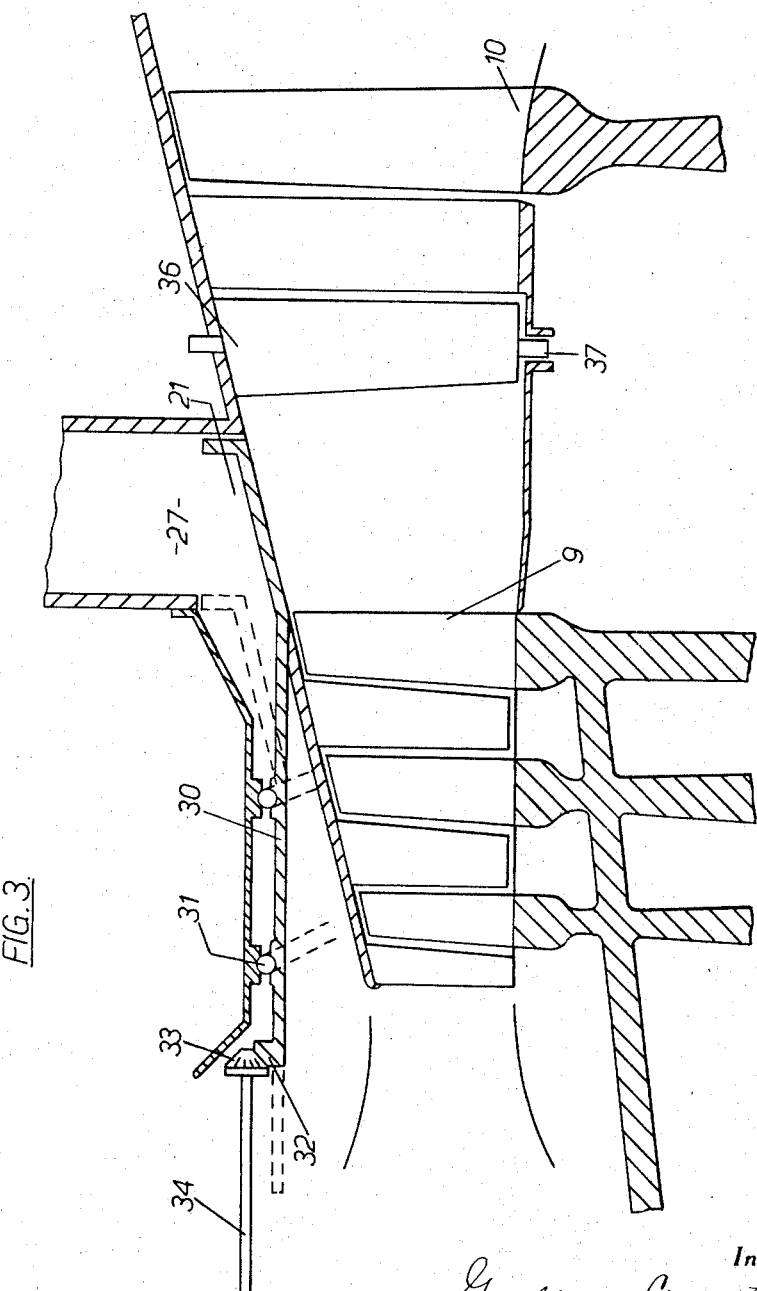

United States Patent Office 3,375,996
Patented Apr. 2, 1968

3,375,996
GAS TURBINE ENGINES
Geoffrey L. Wilde, Turnditch, Cowers Lane, England, assignor to Rolls-Royce Limited, Derby, England, a British company
Filed Feb. 16, 1967, Ser. No. 616,629
Claims priority, application Great Britain, July 12, 1966, 31,208/66
7 Claims. (Cl. 244—7)

ABSTRACT OF THE DISCLOSURE

A by-pass gas turbine jet propulsion engine for a helicopter, the engine having a fan driven by a fan turbine axially spaced from and disposed downstream of the low pressure turbine of the engine and having a valve which either allows the engine gases to pass to the fan turbine to drive the fan for forward propulsion, or deflects the engine gases to drive the helicopter rotor for vertical take-off.

This invention relates to gas turbine power plant and relates more particularly to power plant adapted for use in vertical take-off aircraft.

According to the present invention there is provided a by-pass gas turbine jet propulsion engine adapted to be mounted on an aircraft and comprising a casing defining an annular flow passage containing a compressor, combustion equipment and a first turbine all in flow series, a first shaft forming a driving connection between the first turbine and the first compressor, a second shaft disposed concentrically within the first shaft, a fan mounted on said second shaft coaxially with the compressor, and a second turbine mounted in the flow passage downstream of the first turbine on said second shaft to drive the fan, the two turbines being axially spaced apart, a duct communicating with at least one port disposed in the casing between the two turbines, said duct being adapted to communicate with the lift device of the aircraft means being provided which are movable from an operative position, in which the flow of gases from the first turbine to the second turbine is decreased and simultaneously the port is opened to allow gases from between the first and second turbines to flow into the duct, to an inoperative position in which the port is closed off and gases from the first turbine are allowed to pass to the second turbine.

The aircraft for which the said engine is to be used is preferably a rotary wing aircraft and the said gases are diverted from a second turbine to drive the rotary wing of the aircraft, either via a turbine, or by being ejected from the tips of the rotor.

In one embodiment of the invention the valve means comprises a slidable annular sleeve which may be operated by a hydraulic ram to selectively cover or uncover bleed ports in the engine casing, the ram being operated in conjunction with means to rotate a ring of vanes to open or close the duct carrying the flow of gases to the second turbine. The vanes may extend radially across the flow of gases upstream of the second turbine and may also constitute the guide vanes for the second turbine. The bleed ports may communicate with a volute or annular duct through which the hot gases may pass to the aircraft rotor or other lift device.

In an alternative embodiment the valve means may be in the form of a sleeve valve mounted to rotate in helical grooves, so that on being made to rotate it moves axially to open or close the bleed ports. Again movement of the valve will only take place in conjunction with movement of a ring of vanes which would close or open the duct carrying the flow of gases to the second turbine.

The engine may have three concentrically mounted shafts for driving high pressure and low pressure compressors from high pressure and low pressure turbines respectively and for driving a fan mounted upstream of the low pressure compressor. The fan is driven from a fan turbine mounted downstream of, and axially spaced from, the low pressure turbines, the valve means being disposed between the low pressure turbine and the fan turbine.

The invention will now be described in more detail, merely by way of example, with reference to the accompanying drawings in which:

FIGURE 1 shows a helicopter incorporating the engine of the present invention.

FIGURE 2 illustrates diagrammatically the layout of the engine of FIGURE 1, only half of the engine being shown.

FIGURE 3 is a detail of an alternate form of a diverter valve for use in the engine of FIGURE 2.

Referring now to FIGURE 1 there is shown a helicopter 1 having a rotor 2 which comprises three rotatable blades 3.

The helicopter is powered both for vertical and horizontal flight by two gas turbine engines 4.

One gas turbine engine 4 is illustrated in FIGURE 2 and comprises, a front fan 5, an LP compressor 6 and an HP compressor 7 all in flow series. The HP compressor is driven by an HP turbine 8 via an HP shaft 11, the LP compressor is driven by an LP turbine 9 via an LP shaft 12, and the fan 5 is driven by a fan turbine 10 via a shaft 13. The shafts 11, 12, 13 are mounted concentrically in bearings 14, 15 and 16 respectively.

Combustion equipment 18 is disposed in flow series between the HP compressor and the HP turbine, the hot gases from the combustion equipment passing out through the HP and LP turbine 8 and 9 respectively and entering the space 17 between the LP turbine 9 and the fan turbine 10.

A cylindrical diverter valve 20 is disposed in the space 17 and is arranged to open or close a plurality of circumferentially spaced ports 21 in the casing of the engine. The valve comprises a sleeve 22 which is axially movable by means of a hydraulic or pneumatic ram 23. The valve is operated in conjunction with a ring of pivotable vanes 24 which are pivoted by means of levers 25 which are also operated by the ram 23.

The operation is such that when the ram 23 is operated to move the sleeve 22 to close the ports 21, the levers 25 pivot the vanes 24 into a position such that the hot gases pass out of the space 17 through the vanes 24 and a ring of guide vanes 26 to the fan turbine 10. When the ram 23 is operated to move the sleeve 22 to open the ports 21 the levers 25 pivot the vanes to a position such that the flow of gases to the fan turbine is prevented and the hot gases pass out of the space 17 through the ports 21 to a duct 27.

The duct 27 conveys the hot gases to a turbine (not shown) which drives the rotor blades 3 of the aircraft.

An alternative form of diverter valve which may be used is shown in FIGURE 3, and comprises a cylindrical sleeve 30 which surrounds the engine casing and is mounted in a helical ball bearing race 31. The sleeve is provided with a bevel gear 32 which meshes with a bevel gear 33 mounted on a shaft 34 driven from a motor (not shown).

When the shaft 34 is rotated, the sleeve is also rotated and moves backwards or forwards, depending on the direction of rotation of the shaft, due to the action of the helical bearing race, to open and close a port 35. A ring of vanes 36 are provided which are pivotable about a vertical axis 37. Movement of the sleeve 30 is effected in conjunction with the pivoting of the ring of vanes 36 by means not shown which respectively open and close to allow or prevent gases flowing through the fan turbine 10, while the sleeve correspondingly closes and opens a port 36 which communicates with a duct 37.

The main advantage of an arrangement described herein is that the gases in the space 17 are at relatively high pressure prior to passing through the fan turbine. There is therefore more work available in the hot gases to drive the helicopter rotor than would be the case if the gases exhausted from the fan turbine were used.

In operation the valve 20 would be initially operated to divert the hot gases to the rotor turbine for vertical take-off when sufficient altitude and forward speed had been obtained, the valve 20 would be operated to close the ports leading to the rotor turbine and allow gases to pass through the fan turbine to provide forward thrust.

We claim:

1. An aircraft having wings for producing lift forces during forward flight, and a lift device for producing lift forces on the aircraft independently of those produced by the wings, a by-pass gas turbine jet propulsion engine mounted on the aircraft and comprising a casing defining an annular flow passage containing a compressor, combustion equipment and a first turbine all in flow series, a first shaft forming a driving connection between the first turbine and the first compressor, a second shaft disposed concentrically within the first shaft, a fan mounted on said second shaft coaxially with the compressor, and a second turbine mounted in the flow passage downstream of the first turbine on said second shaft to drive the fan, and wherein the two turbines are axially spaced apart and, a duct communicates with at least one port disposed in the casing between the two turbines, said duct being adapted to communicate with the lift device of the aircraft, means being provided which are movable from an operative position, in which the flow of gases from the first turbine to the second turbine is decreased and simultaneously the port is opened to allow gases from between the first and second turbines to flow into the duct, to an inoperative position in which the port is closed off and gases from the first turbine are allowed to pass to the second turbine.

2. An aircraft as claimed in claim 1 and in which the high lift device comprises a rotor having at least three blades, and a turbine mounted in the duct to drive the rotor.

3. An aircraft as claimed in claim 1 and in which the high lift device comprises a rotor having at least three blades and driven by gases from the engine being exhausted from the blade tips.

4. A by-pass gas turbine jet propulsion engine adapted for use in an aircraft as claimed in claim 1 and in which the movable means of the engine comprise a cylindrical valve movable axially of the engine to open or close the port, and a ring of vanes which extend radially across the annular flow passage between the port and the second turbine and which are pivotable in conjunction with the valve to correspondingly prevent or allow flow of gases from the first turbine to the second turbine.

5. A by-pass gas turbine jet propulsion engine according to claim 4 and in which the ring of vanes also comprise guide vanes for the second turbine.

6. A by-pass gas turbine jet propulsion engine as claimed in claim 4 and in which the cylindrical valve comprises a cylindrical sleeve and a hydraulic ram is provided for moving said sleeve.

7. A by-pass gas turbine jet propulsion engine as claimed in claim 6 and in which the cylindrical valve comprises a cylindrical sleeve, a helical bearing race in which the sleeve is mounted and a plurality of bevel gear teeth on the sleeve which are adapted to mesh with a bevel gear wheel on a shaft, the arrangement being such that a rotation of the shaft, the sleeve is rotated and caused to move axially to open or close the port.

References Cited
UNITED STATES PATENTS

| | | | |
|---|---|---|---|
| 2,650,666 | 9/1953 | Dorand | 60—224 |
| 2,941,749 | 6/1960 | Sullivan | 170—135.71 |
| 3,263,416 | 8/1966 | Bill | 60—226 |

CARLTON R. CROYLE, *Primary Examiner.*

D. HART, *Assistant Examiner.*